(12) United States Patent
Piehler (10) Patent No.: US 6,304,369 B1
(45) Date of Patent: Oct. 16, 2001

(54) METHOD AND APPARATUS FOR ELIMINATING NOISE IN ANALOG FIBER LINKS

(75) Inventor: David Piehler, Half Moon Bay, CA (US)

(73) Assignee: Harmonic, Inc., Sunnyvale, CA (US)

( * ) Notice: Subject to any disclaimer, the term of this patent is extended or adjusted under 35 U.S.C. 154(b) by 0 days.

(21) Appl. No.: 09/364,003

(22) Filed: Jul. 29, 1999

(51) Int. Cl.[7] .................................................. G02B 6/12
(52) U.S. Cl. ......................... 359/337.4; 359/341; 372/6
(58) Field of Search .................................. 385/3, 11, 45; 359/245, 272, 337, 341, 349

(56) References Cited

U.S. PATENT DOCUMENTS

| | | | |
|---|---|---|---|
| 5,200,964 | 4/1993 | Huber | 372/26 |
| 5,253,309 | 10/1993 | Nazarathy et al. | 385/4 |
| 5,331,449 | 7/1994 | Huber et al. | 359/125 |
| 5,532,857 | 7/1996 | Gertel et al. | 359/154 |
| 5,671,075 | 9/1997 | Ramachandran et al. | 359/180 |
| 5,724,459 | 3/1998 | Banba et al. | 385/3 |
| 5,828,477 | 10/1998 | Nilsson et al. | 359/181 |
| 5,880,870 | 3/1999 | Sieben et al. | 359/181 |
| 5,890,816 | 4/1999 | Delaveux | 385/11 |
| 5,896,221 | 4/1999 | Saeki | 359/341 |
| 6,064,507 | 12/1998 | Heflinger et al. | 359/237 |

OTHER PUBLICATIONS

Ackerman, E et al, "Balanced Receiver External Modulation Fiber–Optic Link Architecture With Reduced Noise Figure," GE Electronics Laboratory, Syracuse, N.Y., 1993 *IEEE MTT–S Digest*, pp. 723–726.

Piehler, D. et al, "55db CNR over 50 km of fibre in an 80–channel externally–modulated AM–CATV system without optical amplification," *Electronics Letters*, vol. 33, No. 3, Jan. 30, 1997, pp. 226–227.

Piehler, D., "Differential Detection in Cable Television," 1999 IEEE/LEDS Summer Topical Meeting: RF Photonics for CATV and HFC Systems, San Diego, CA, Jul. 30, 1992, 2 pages.

Piehler, D. et al, "Influence of SBS suppression on distortion in an optically amplified analog video transport system," *Optical Amplifiers And Their Applications*, Technical Digest, Jul. 11–13, 1996, Monterey, CA, pp 246–249.

Willlems, F.W. et al., "Optical Amplifier Noise Figure Determination by Signal RIN Subtraction," *Technical Digest Symposium on Optical Fiber Measurements*, 1994, NIST Special Publication 864, pp. 7–9.

Kuo, C.Y. et al, "High–performance optically amplified 1550–nm lightwave AM–VSB CATV transport system," *Optical Fiber Communication Technical Digest*, vol. 2, Feb. 25–Mar. 1, 1996, San Jose, CA, pp. 196–197.

"Applying push–pull technology to optical networks, *A new approach to high performance transmission*," by Patrick Harshman, Sep., 1996.

"FM–AM Noise Conversion In Dispersive Single–Mode Fibre Transmission Lines," by K. Petermann, Oct. 22, 1990.

(List continued on next page.)

*Primary Examiner*—Thomas H. Tarcza
*Assistant Examiner*—Deandra M. Hughes
(74) *Attorney, Agent, or Firm*—Skjerven Morrill MacPherson; Marc R. Ascolese (57) ABSTRACT

An optical transmission system that includes an optical amplifier coupled to the input of an optical modulator having at least two complementary output ports for providing complementary modulated optical output signals can be used such that the relative intensity noise (RIN) associated with the optical amplifier is coupled into the modulated optical output signals as common mode noise and can therefore be eliminated using a differential detection scheme. Removing the RIN associated with the optical amplifier advantageously increases the carrier to noise ratio (CNR) for the optical transmission system.

26 Claims, 5 Drawing Sheets

OTHER PUBLICATIONS

"Suppresion of Dynamic Cross Saturation in Cascades of Overpumped Erbium–Doped Fiber Amplifiers," by M. Karásek and F.W. Willems, Jul. 7, 1998.

"High—Performance Optically Amplified 1550–NM Lightwave AM–VSB CATV Transport System," by C.Y. Kuo, D. Piehler, C. Gall, J. Kleefeld, A. Nilsson, L. Middleton, Optical Fiber Communication Technical Digest, 1996.

"Differential Detection in Cable Television," by David Piehler, Nov. 26. 1999.

"dB CNR Over 50km of Fibre in an 80–Channel Externally–Modulated AM–CATV System Without Optical Amplification," by D. Piehler, X. Zou, C.Y. Kuo, A. Nilsson, J. Kleefeld, G. Garcia, J.D. Ralston and A. Mathur, Jan. 30, 1997.

"Optical Amplifier Noise Figure Determination by Signal RIN Subtraction," by F.W. Willems, J.C. van der Plaats, C. Hentschedl and E. Leckel, U.S. Dept. of Commerce National Institute of Standards and Technology, Technical Digest on Optical Fiber Measurements, 1994.

"Influence of SBS Suppression on Distortion in an Optically Amplified Analog Video Transport System," by David Piehler, Chien–Yu Kuo, Joseph Kleefeld, Charles Gall, Alan Nilsson and Xingyu Zou, Technical Digest, 1996.

"Balanced Receiver External Modulation Fiber–Optic Link Architecture With Reduced Noise Figure," by E. Ackerman, S. Wanuga, J. MacDonald, and J. Prince, 1993.

METHOD AND APPARATUS FOR ELIMINATING NOISE IN ANALOG FIBER LINKS

BACKGROUND OF THE INVENTION

1. Field of the Invention

This invention relates to optical transmission systems, and more specifically to noise reduction in fiber optic transmission systems carrying broadband signals.

2. Description of the Related Art

Fiber optical transmission is commonly used for the economical distribution of broadband signal content (such as multi-channel cable television (CATV) systems) as a means to transmit amplitude modulated/frequency division multiplexed (AM/FDM) signals over long distances, with or without repeaters. Such optical fiber links apply optical intensity modulation to a light source, sending the modulated light signal via fiber to a receiver which converts the optical intensity signal back to an electrical signal. The modulating electrical signal is a composite signal with the AM video channels multiplexed in frequency.

Externally modulated differential detection transmission systems, such as the systems described in U.S. Pat. No. 5,253,309, entitled "Optical Distribution of Analog and Digital Signals Using Optical Modulators with Complementary Outputs," by Nazarathy et al., and incorporated herein by reference in its entirety, are known to reduce two signal degrading effects associated with the above described optical transmission, namely, phase-to-amplitude noise conversion and fiber-induced composite second order distortion (CSO). In addition, the use of differential detection raises the net carrier-to-noise ratio (CNR) by taking advantage of complementary carrier power that would otherwise be lost at the optical modulator.

Figure 1:
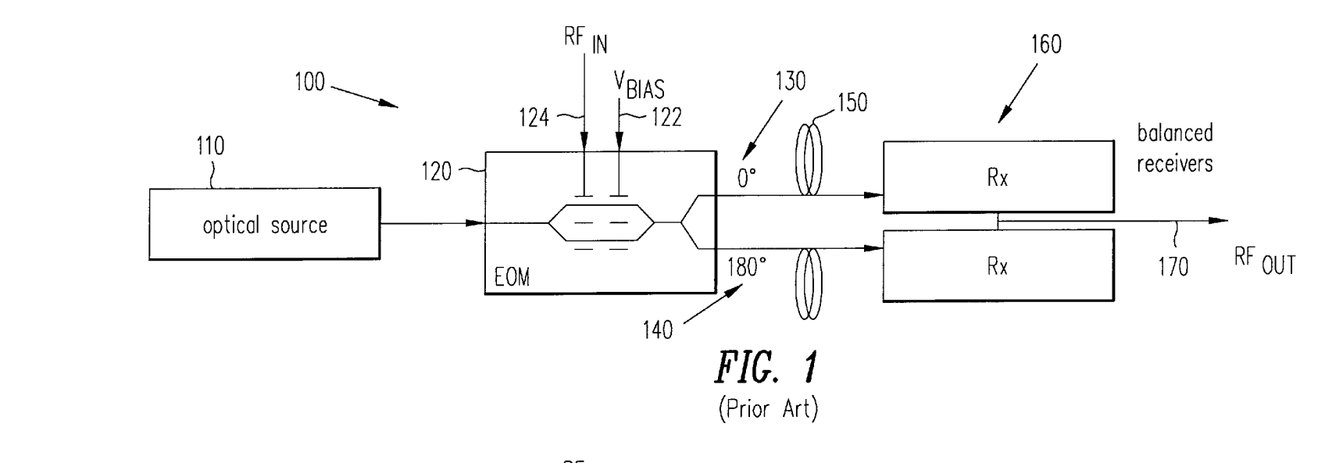
FIG. 1 illustrates a prior art optical transmission system using differential detection.

FIG. 1 illustrates a prior art externally modulated differential detection transmission system 100. Optical source 110, typically a laser such as a distributed feedback laser (DFB), provides an optical carrier to modulator 120, typically a dualoutput lithium niobate (LiNbO$_3$) electro-optic modulator. When properly biased by bias voltage 122, modulator 120 will produce two lightwave signals (e.g., complementary output signals 130 and 140), encoded with the same RF information (as provided by RF input 124), and 180° out of phase with each other. These signals can propagate through optical media such as optical fibers 150, and subsequently be detected by a balanced receiver 160 which includes, for example, two distinct photodetectors. The detected signals can then be recombined in the RF domain to provide RF output 170. As long as the total path lengths of the two transmission links (including both the optical fiber and coaxial cable elements of those paths) are within (c/n)/v of each other, where v is the highest frequency CATV channel and c/n is the speed of light in the fiber, the RF carriers will add coherently, generally increasing by 6 dB over the carrier power for a single transmission link. Additionally, most of the noise from the two photodetectors will add incoherently, thereby increasing by 3 dB. The net benefit is a 3 dB increase in the CNR. Common mode noise and distortion will cancel in the recombined signal.

Three examples of common mode noise and distortion canceled by differential detection are relative intensity noise (RIN) associated with the DFB optical source, phase-to-amplitude noise conversion, and CSO. Since the complementary output signals 130 and 140 of modulator 120 are derived from the same optical source, the RIN caused by intensity fluctuations in the DFB is common to both output signals, and appears with equal amplitudes and in the same direction with respect to the quadrature point to which the modulator is linearized. Thus, upon subtraction of the two detected signals at balanced receiver 160, the RIN is canceled. In contrast, the carrier signals in the two complementary output signals 130 and 140 have equal amplitudes but opposite directions with respect to the quadrature point to which the modulator is linearized. Consequently, subtraction of the two signals at the balanced receiver results in reinforcing the resultant signal to double the value of the modulation signals in each transmission link.

CSO is generated by the interaction of self-phase modulation with dispersion in the optical fiber. The effect generally increases as the square of the fiber length, dispersion, and launch power, and is most severe at high channel frequencies. The use of differential detection both cancels the fiber-induced CSO and minimizes the effect of the external phase modulation on the CSO.

Dispersion in the optical fiber will convert phase noise into amplitude noise. This effect is most severe at high channel frequencies. At high frequencies (e.g., greater than 400 MHz) differential detection provides additional CNR improvement of approximately 1.5 dB beyond what would be expected for uncorrelated noise. This effect is due to the cancellation of phase-to-amplitude noise, which is correlated between the two fiber links because it originates in the noise of the common DFB laser.

Figure 3A:
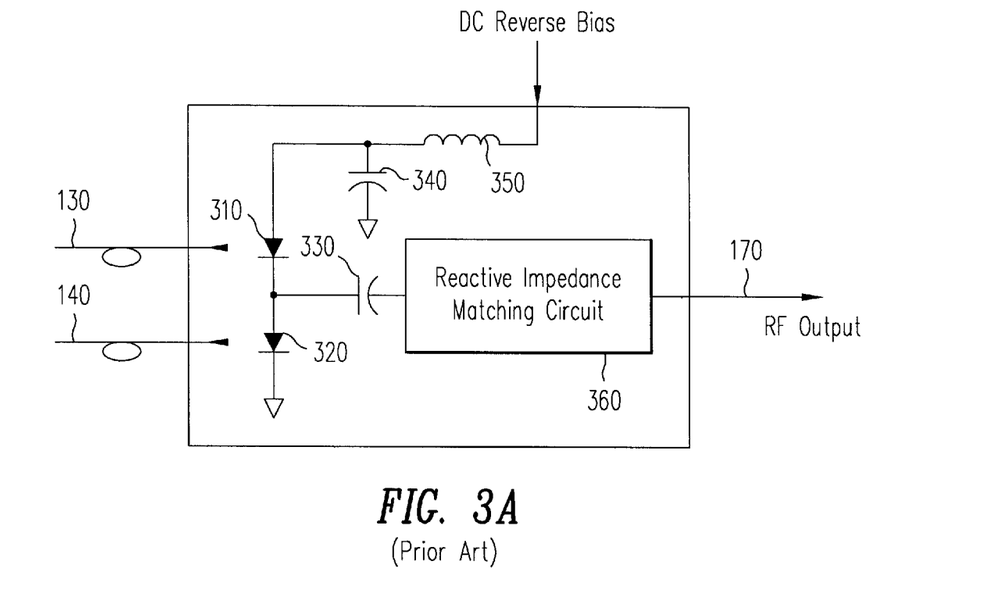
FIGS. 3A–3B show two prior art balanced receivers.
Figure 3B:
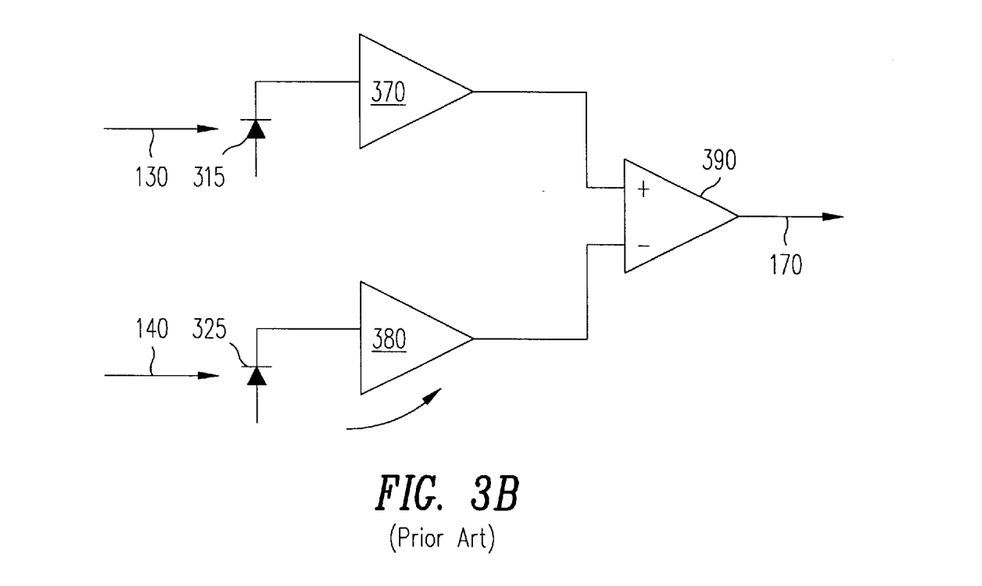

Balanced receiver 160 can be implemented in a variety of ways, as illustrated by the examples shown in FIGS. 3A–3B. In FIG. 3A, complementary output signals 130 and 140 are optically coupled to identical photodiodes 310 and 320, respectively. Photodiodes 310 and 320 convert the incoming optical signals into photocurrents. For the RF signals typically produced by photodiodes 310 and 320, capacitors 330 and 340 essentially provide a short circuit and inductor 350 essentially provides an open circuit. Reactive impedance matching circuit 360 is then used to extract a differential RF output signal 170. A balanced receiver may also be realized by taking a the RF outputs from pair of standard optical receivers modules, applying a phase shift of 180° degrees to one RF leg, then combining the resulting RF signal in phase.

In FIG. 3B, complementary output signals 130 and 140 are optically coupled to identical photodiodes 315 and 325, respectively. Photodiodes 315 and 325 convert the incoming optical signals into photocurrents. These photocurrents are amplified by amplifiers 370 and 380. Differential amplifier 390 is used to subtract the amplified signals from each other and thereby produce RF output signal 170.

Figure 2:
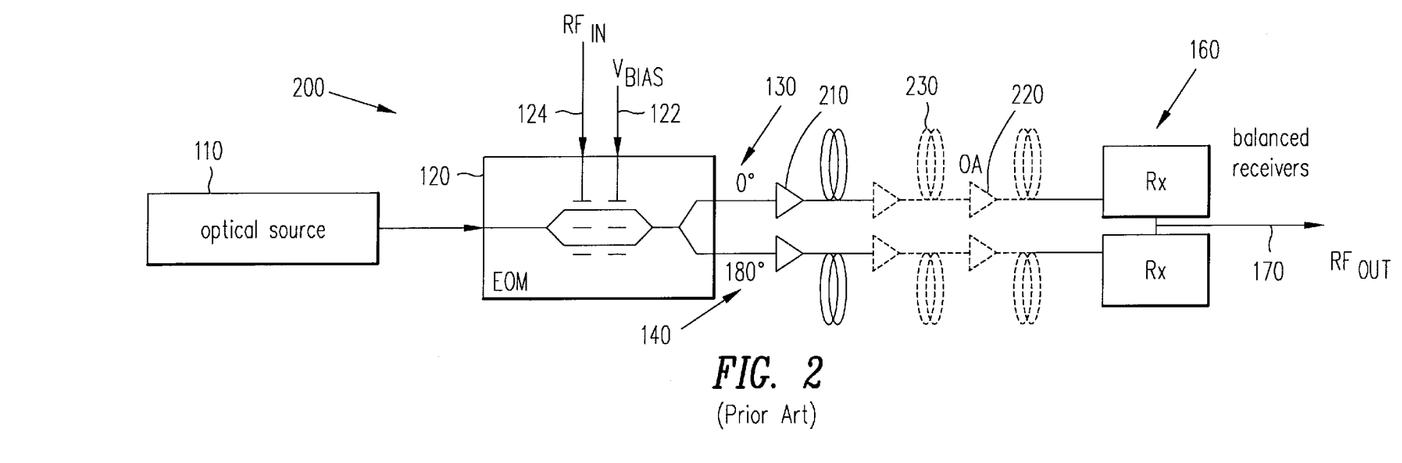
FIG. 2 illustrates a prior art optical transmission system including optical amplifiers and using differential detection.

As illustrated by FIG. 1, many externally modulated differential detection transmission systems do not need additional optical amplification. However, when the length of the fiber link is extended, or when other optical power losses must be compensated for (e.g., insertion losses at the external modulator) optical amplifiers are often used to amplify the optical signal. The availability of efficient erbium doped fiber amplifiers (EDFAs) operating in the 1550 nm wavelength region, where standard telecommunication fiber exhibits its minimum attenuation, has motivated the development of broadband transmitters compatible with the gain bandwidth of EDFAs. FIG. 2 illustrates a transmission system 200 (similar to transmission system 100 of FIG. 1) that includes EDFAs 210. The optical power is amplified by an EDFA which is downstream from the external modulator. Thus the information bearing light signal enters the fiber optic span with an optical signal determined by the saturated output power of the EDFA. Note that additional EDFAs 220 and fiber lengths 230 can be added to transmission system 200 to extend its overall length.

However, a closer look at the CNR of such a transmission system demonstrates that EDFAs added to the system contribute additional noise. CNR is a function of the optical modulation index m, the photocurrent at the receiver $I_{photo}$, electrical bandwidth $B_e$ (typically 4 MHz for NTSC based CATV systems), shot noise at the receiver $2eI_{photo}$, thermal equivalent noise $i_{th}$, and the RIN of the signal:

$$CNR = \frac{\frac{1}{2}m^2 I_{photo}^2}{B_e[i_{th}^2 + 2eI_{photo} + (RIN)I_{photo}^2]}. \tag{1}$$

Note that in equation 1, RIN is the sum of RIN from a variety of sources including the DFB laser. For example, each EDFA inserted into the transmission system contributes:

$$RIN_{EDFA} = \left(NF - \frac{1}{G}\right)\frac{2h\nu}{P_{in}}, \tag{2}$$

where NF is the EDFAs noise figure, $P_{in}$ is the optical input power to the EDFA, hν is the photon energy, and G is the net gain of the EDFA.

CNR is a primary figure of merit in optical transmission systems, and thus raising the CNR for a given system is desirable. Accordingly, it is desirable to have an optical transmission system that includes optical amplifiers, while reducing some of the noise contributed by those amplifiers.

SUMMARY OF THE INVENTION

It has been discovered that an optical transmission system that includes an optical amplifier coupled to the input of an optical modulator having at least two complementary output ports for providing complementary modulated optical output signals can be used such that the RIN associated with the optical amplifier is coupled into the modulated optical output signals as common mode noise and can therefore be eliminated using a differential detection scheme. Removing the RIN associated with the optical amplifier advantageously increases CNR for the optical transmission system.

Additionally, if the optical amplifier is, for example, an EDFA, coupling the amplifier between an optical source and the optical modulator (as opposed to coupling the amplifier to the output of the optical modulator), typically increases the optical input power $P_{in}$ for the amplifier. As can be seen from equation 2, a higher $P_{in}$ means that the EDFA can have a larger noise factor (NF) and still maintain the same RIN value. In general, EDFAs with high NF are less expensive than EDFAs with low NF.

This optical transmission system also takes advantage of the power increase inherent when using complementary modulated optical output signals, even when those signals are not subsequently differentially detected.

Accordingly, one aspect of the present invention provides an optical transmission system including an optical amplifier and an optical modulator. The optical amplifier is operable to receive an optical signal from an optical source and provide an amplified optical signal. The optical modulator has an input port coupled to the optical amplifier, a modulation port operable to receive a modulation signal including information for transmission, and a plurality of complementary output ports for providing a plurality of complementary modulated optical output signals in response to the modulation signal and the amplified optical signal.

In another aspect of the invention, a method of transmitting an optical signal is taught. An optical signal from an optical source is provided. The optical signal is amplified with an optical amplifier wherein the amplifying introduces noise into the optical signal. The optical signal is modulated in accordance with a modulation signal having information for transmission, and the modulating produces first and second complementary modulated optical output signals. The first and second complementary modulated optical output signals are transmitted through a first and a second optical medium, respectively. The first and second complementary modulated optical output signals are received at a balanced receiver, thereby forming first and second detected signals, respectively. At least a part of the noise is removed by taking the difference between the first and second detected signals.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION

In the following description, numerous specific details are set forth in order to provide a thorough understanding of the present invention. It will be obvious, however, to one having ordinary skill in the art that the present invention may be practiced without these specific details. In other instances, well-known circuits, structures and techniques have not been shown in detail in order not to unnecessarily obscure the present invention.

Figure 4:
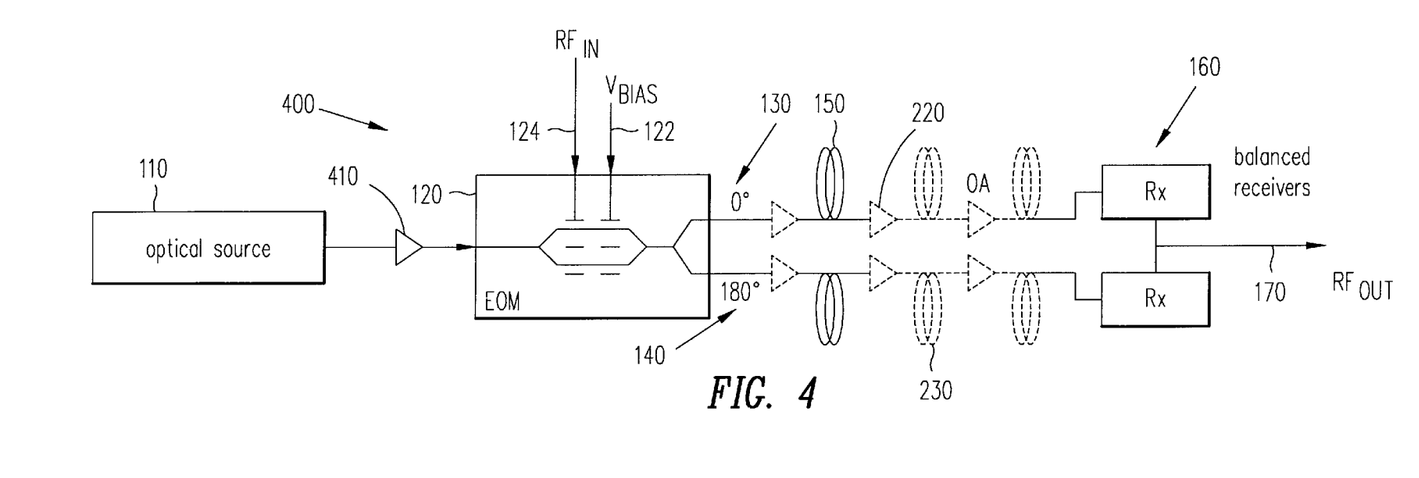
FIG. 4 illustrates an optical transmission system in accordance with the present invention.

Optical transmission system 400 (as illustrated in FIG. 4) includes an optical amplifier 410 between optical source 110 and modulator 120. By virtue of amplifying the optical signal before modulating it, any RIN contributed by optical amplifier 410 appears as common mode noise, i.e., it is identical in both output signals 130 and 140. As noted above, EDFAs are typically used for optical amplifiers in optical transmission systems, however those having ordinary skill in the art will readily recognize that a variety of different optical amplifiers can be used for amplifier 410. Fiber amplifiers based on other rare earth dopants and host glasses (e.g., Nd in ZBLN glass) are possible. Other examples of optical amplifiers include: semiconductor optical amplifiers (SOAs) based on single-pass amplification in semiconductor structures similar to those used in semiconductor laser diodes; and Raman amplifers using glass fibers as the active medium and exploiting the stimulated Raman effect.

To illustrate the CNR benefits associated with optical transmission system 400, assume that optical source 110 is a 5 mW 1550 nm DFB laser, the complementary fiber links include no additional EDFAs (such as optional amplifier 220), and the fiber links are equal length 50 km single mode fibers (SMFs) having 11 dB loss at 1550 nm. Optical source 110 produces 7 dBm, that is supplied to optical amplifier 410

(in this case an EDFA). The saturated output power of optical amplifier 410 is 21 dBm (typical for EDFAs), which is supplied to optical modulator 120, which is in this example a LiNbO$_3$ modulator having 7 dBm of loss. Thus, the optical signal power received at balanced receiver 160 is 3 dBm in each of the fiber links. If each photodetector of receiver 160 produces 1 mA of current for 1 mW of received signal, then the 3 dBm of optical power yields a photocurrent $I_{photo}$=2 mA. If additional assumptions are made regarding typical system properties (e.g., DFB laser RIN, EDFA noise figure, there are only RIN contributions associated with the laser and the EDFA, etc.) the noise observed at a single detector is calculated to be −139 dB, and the noise after differential detection is calculated to be −142.5 dB.

It is significant to note that the noise level actually falls by 3.5 dB. This compares very favorably with prior art systems in which noise increases by 3 dB under differential detection. For a typical optical modulation index (e.g., m=3%) the single receiver CNR is 52 dB and the differential detection CNR is 61.1 dB, an 8.9 dB increase in CNR compared to the previously noted approximately 3 dB increase in CNR for optical transmission systems like those of FIGS. 1 and 2. Experiments under high EDFA noise conditions (e.g., low EDFA input power) demonstrate that differential detection combined with amplifier location before the modulator yields CNR increases in excess of 7 dB for all channels in the CATV broadband.

Figure 5:
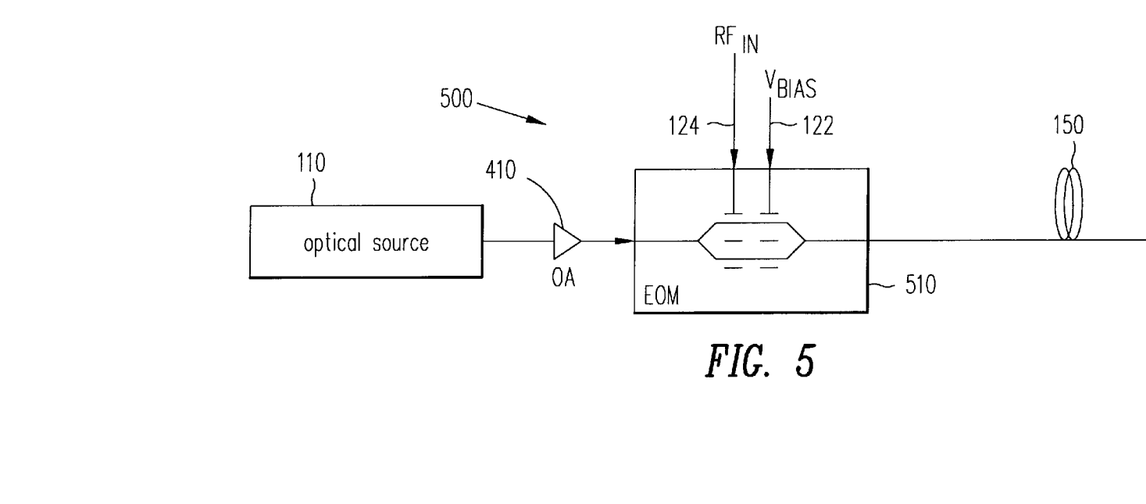
FIGS. 5–7 illustrate additional optical transmission systems in accordance with the present invention.

FIG. 5 illustrates an optical transmission system 500 including an optical amplifier 410 between optical source 10 and modulator 510. Note that modulator 510 is not a dual output modulator like modulator 120, and consequently no balanced receiver is shown, i.e., there is no differential detection. Nevertheless, optical transmission system 500 benefits from the location of amplifier 410 with respect to modulator 510 in that the optical input power $P_{in}$ for the amplifier is increased. As can be seen from equation 2, a higher $P_{in}$ allows the EDFA to tolerate a larger noise factor (NF) and still maintain the same RIN value. In general, EDFAs with high NF are less expensive than EDFAs with low NF.

Figure 6:
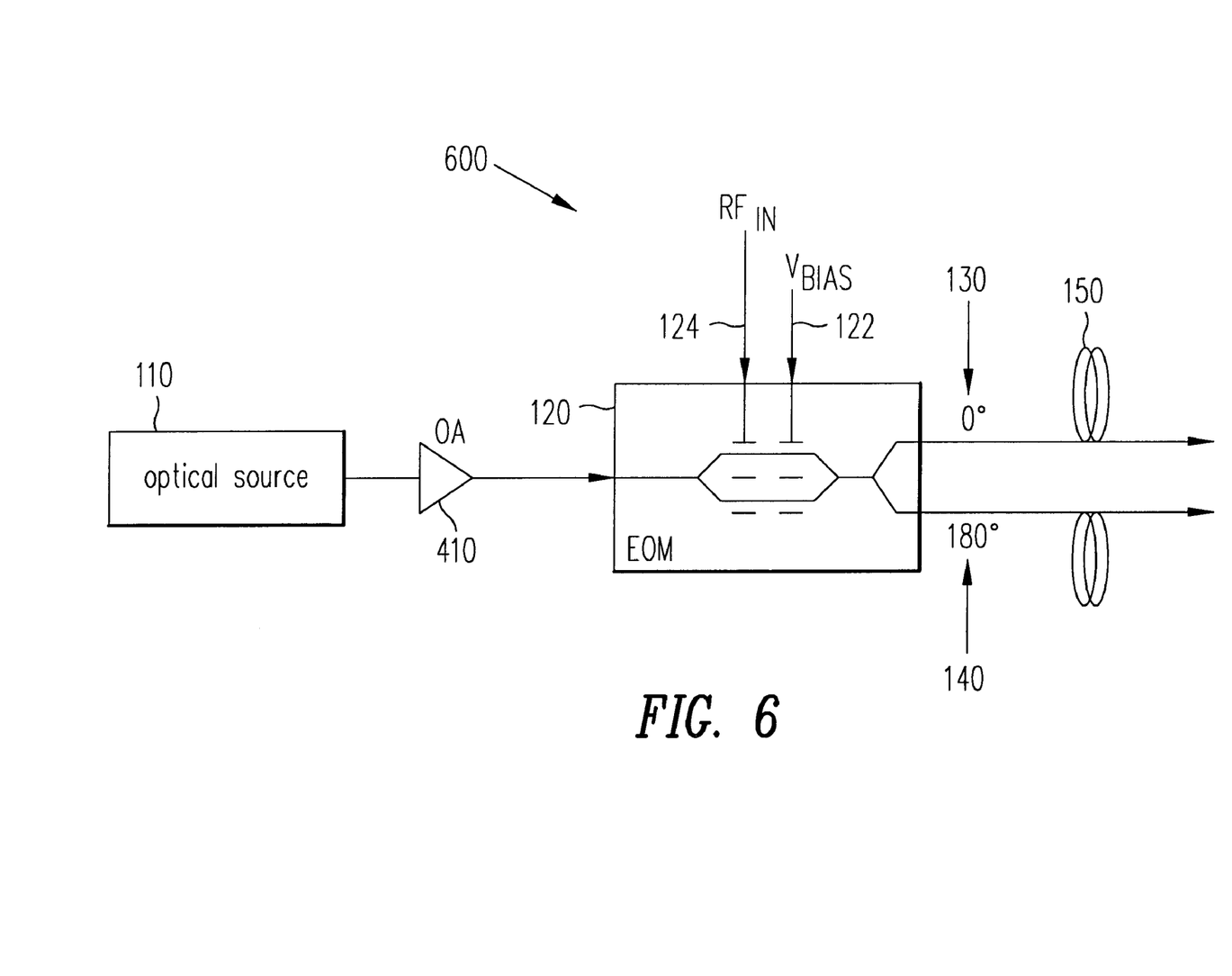
Figure 7:
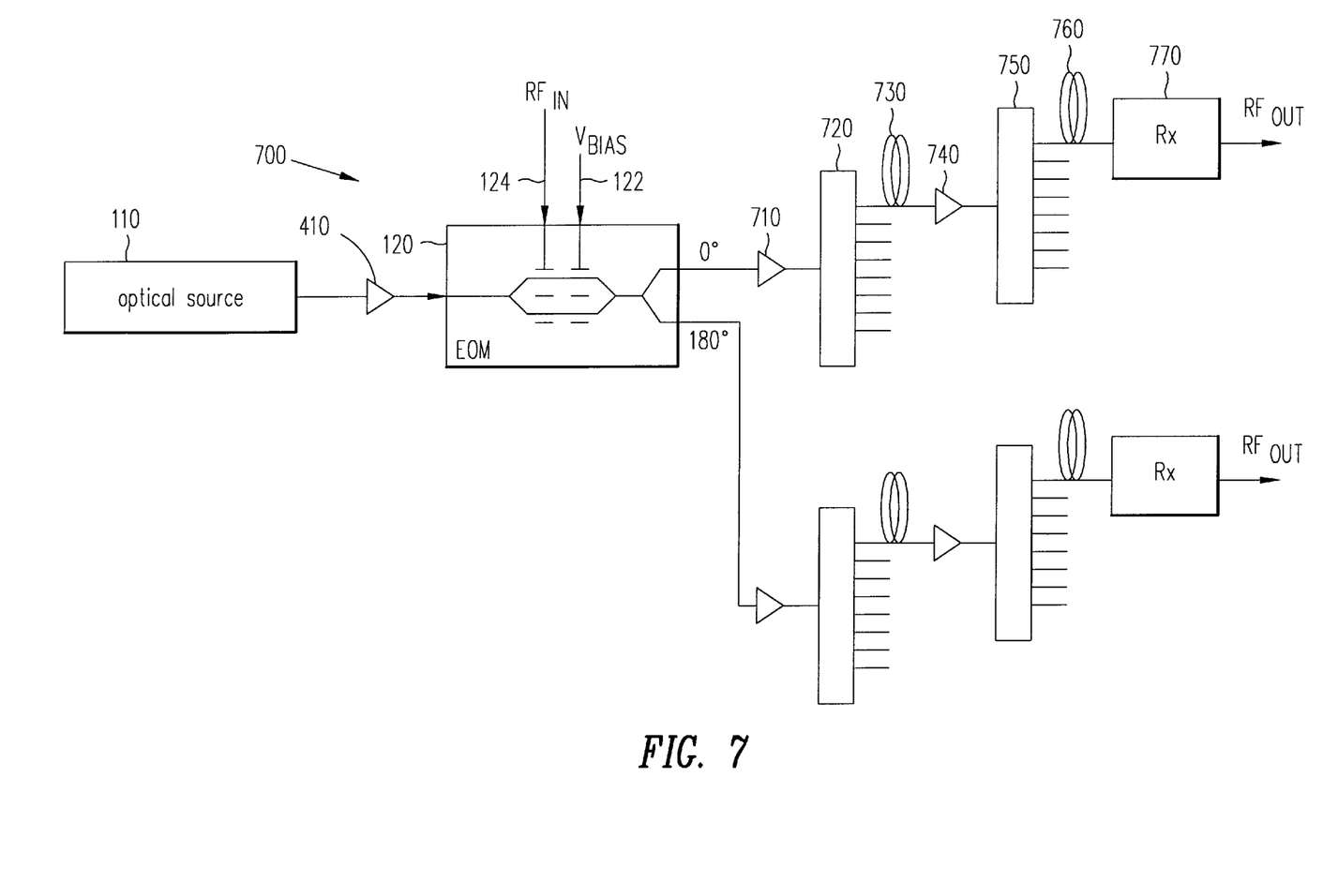

FIG. 6 illustrates an optical transmission system 600 similar to optical transmission system 400, but differing in that it is not intended for use with differential detection. Nevertheless, optical transmission system 600 benefits from the same EDFA advantages of optical transmission system 500. Moreover, because optical transmission system 600 utilizes a dual output modulator, it possesses the net power increase inherent when using complementary modulated optical output signals, as opposed to using only a single output modulator. FIG. 7 illustrates a tree-and-branch architecture optical transmission system 700 similar to those used by the cable industry for video distribution. Splitters 720 divide the optical signal for multiple instance distribution. Additionally fiber lengths 730 and 760, and amplifiers 710 and 740 allow the signal distribution to be further extended. Note that each final destination would include a receiver 770 producing an RF output signal. However, in contrast to prior art tree-and-branch architectures, system 700 includes optical amplifier placement and a dual output modulator as in system 600, thereby extending the aforementioned benefits to system 700. One would typically like to distribute many optical fibers from the headend of a cable network, so it is advantageous to find methods of reducing the number of transmitters used to modulate the video signals onto the outgoing multiple fibers.

Those having ordinary skill in the art will readily recognize that a variety of different components and techniques can be substituted for those previously described. The optical sources described are typically semiconductor DFB lasers, but a variety of different types of lasers can be used, for example Nd:YAG lasers. A variety of different types of EDFAs. including polarization preserving EDFAs can be used. Lithium niobate electro-optic modulators are the typical example for optical modulators illustrated in this application, but a variety of other optical crystals and modulating materials can be used (e.g., InP), or even non-electro-optic modulators (e.g., acousto-optic modulators). Moreover, different modulator designs can be chosen to provide complementary modulator outputs, such as Mach-Zelhnder interferometers, directional couplers, Y-fed directional couplers. balanced-bridge interferometers, and a phase-shifting interferometers. These and other modulator designs are described in greater detail in U.S. Pat. No. 5,253,309, previously incorporated by reference in its entirety. The optical medium through which optical signals are transmitted is typically a SMF fiber, but other types of fiber (e.go., dispersion shifted, polarization preserving, multi-mode), optical wave guides, and indeed air (e. g., an above ground line of sight transmission system) can be used with the invention(s) described in this application.

The description of the invention set forth herein is illustrative and is not intended to limit the scope of the invention as set forth in the following claims. Variations and modifications of the embodiments disclosed herein may be made based on the description set forth herein, without departing from the scope and spirit of the invention as set forth in the following claims.

What is claimed is:

1. An optical transmission system comprising:
   an optical amplifier, operable to receive an optical signal from an optical source and provide an amplified optical signal; and
   an optical modulator having an input port coupled to the optical amplifier, a modulation port operable to receive a modulation signal including information for transmission, and a plurality of complementary output ports for providing a plurality of complementary modulated optical output signals in response to the modulation signal and the amplified optical signal.

2. The optical transmission system of claim 1 further comprising an optical source coupled to the optical amplifier, the optical source being operable to provide an optical signal comprising a light beam.

3. The optical transmission system of claim 2 wherein the optical source is a laser.

4. The optical transmission system of claim 3 wherein the laser is a distributed feedback (DFB) laser.

5. The optical transmission system of claim 1 wherein the plurality of complementary modulated optical output signals includes a first and a second complementary modulated optical output signal, and wherein the first and second complementary modulated optical output signals are 180° out of phase with each other.

6. The optical transmission system of claim 1 wherein the optical modulator is an electro-optical modulator including a Mach-Zehnder interferometer, and the modulation signal is an RF modulation signal.

7. The optical transmission system of claim 6 wherein the electro-optical modulator is a lithium niobate (LiNbO$_3$) modulator.

8. The optical transmission system of claim 1 wherein the optical modulator includes at least one of a directional coupler, a Y-fed directional coupler, a balanced-bridge interferometer, and a phase-shifting interferometer.

9. The optical transmission system of claim 1 wherein the optical amplifier is an erbium doped fiber amplifier (EDFA).

10. The optical transmission system of claim 9 wherein the EDFA preserves the polarization of the optical signal from the optical source.

11. The optical transmission system of claim 10 wherein the EDFA further comprises a polarization preserving optical fiber.

12. The optical transmission system of claim 1 wherein the plurality of complementary modulated optical output signals includes a first and a second complementary modulated optical output signal, the optical transmission system further comprising a balanced receiver operable to receive the first and second complementary modulated optical output signals.

13. The optical transmission system of claim 12 wherein the balanced receiver further comprises:

a first optical receiver coupled to the optical modulator through a first optical medium, the first optical receiver being operable to detect the first complementary modulated optical output signal and provide a first detected signal;

a second optical receiver coupled to the optical modulator through a second optical medium, the second optical receiver being operable to detect the second complementary modulated optical output signal and provide a second detected signal; and a subtraction circuit coupled to the first and second optical receivers, the subtraction circuit operable to provide a difference signal based on a difference between the first and second detected signals.

14. The optical transmission system of claim 13 wherein at least one of the first and second optical receivers is a photodiode.

15. The optical transmission system of claim 13 wherein the optical amplifier is operable to contribute noise to the first and second complementary modulated optical output signals, and difference signal is substantially free of the noise.

16. The optical transmission system of claim 13 wherein at least one of the first optical medium and the second optical medium is an optical fiber.

17. The optical transmission system of claim 13 wherein a first transmission path includes the first optical medium, the first optical receiver, and a coupling between the first optical receiver and the subtraction circuit, and a second transmission path includes the second optical medium, the second optical receiver, and a coupling between the second optical receiver and the subtraction circuit, wherein first transmission path and the second transmission path have substantially the same length.

18. A method of transmitting an optical signal comprising:

providing an optical signal from an optical source;

amplifying the optical signal with an optical amplifier wherein the amplifying introduces noise into the optical signal;

modulating the optical signal in accordance with a modulation signal having information for transmission, the modulating producing a first and a second complementary modulated optical output signal;

transmitting the first and second complementary modulated optical output signals through a first and a second optical medium, respectively;

receiving the first and second complementary modulated optical output signals at a balanced receiver, thereby forming first and second detected signals, respectively; and removing at least a part of the noise by taking the difference between the first and second detected signals.

19. The method of transmitting an optical signal of claim 18 wherein the optical source is a laser.

20. The method of transmitting an optical signal of claim 19 wherein the laser is a distributed feedback (DFB) laser.

21. The method of transmitting an optical signal of claim 18 wherein the modulating further comprises producing the first and second complementary modulated optical output signals 180° out of phase with each other.

22. The method of transmitting an optical signal of claim 18 wherein the modulating is performed by an electro-optical modulator including a Mach-Zehnder interferometer, and the modulation signal is an RF modulation signal.

23. The method of transmitting an optical signal of claim 18 wherein the modulating is performed by an optical modulator that includes at least one of a directional coupler, a Y-fed directional coupler, a balanced-bridge interferometer, and a phase-shifting interferometer.

24. The method of transmitting an optical signal of claim 18 wherein the optical amplifier is an erbium doped fiber amplifier (EDFA).

25. The method of transmitting an optical signal of claim 18 further comprising substantially preserving a polarization of the optical signal during the amplifying.

26. The method of transmitting an optical signal of claim 18 wherein at least one of the first optical medium and the second optical medium is an optical fiber.

* * * * *